United States Patent
Dev et al.

(10) Patent No.: US 9,869,194 B2
(45) Date of Patent: Jan. 16, 2018

(54) SEAL ASSEMBLY TO SEAL CORNER LEAKS IN GAS TURBINE

(71) Applicant: General Electric Company, Schenectady, NY (US)

(72) Inventors: Bodhayan Dev, Niskayuna, NY (US); Robert Carl Meyer, Simpsonville, SC (US); Neelesh Nandkumar Sarawate, Niskayuna, NY (US); Jason Edward Albert, Greenville, SC (US); Gary Michael Itzel, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/087,394

(22) Filed: Mar. 31, 2016

(65) Prior Publication Data
US 2017/0284215 A1  Oct. 5, 2017

(51) Int. Cl.
*F01D 11/00* (2006.01)

(52) U.S. Cl.
CPC ........ *F01D 11/005* (2013.01); *F05D 2220/32* (2013.01); *F05D 2240/59* (2013.01)

(58) Field of Classification Search
CPC ...... F01D 11/005; F01D 25/005; F01D 25/25; F05D 2220/32; F05D 2240/128; F05D 2240/14; F05D 2240/55; F05D 2300/502
See application file for complete search history.

(56) References Cited

U.S. PATENT DOCUMENTS

| | | | |
|---|---|---|---|
| 4,932,207 A | 6/1990 | Harris et al. | |
| 5,154,577 A | 10/1992 | Kellock et al. | |
| 5,868,398 A | 2/1999 | Maier et al. | |
| 5,934,687 A * | 8/1999 | Bagepalli | F01D 11/005 277/637 |
| 6,893,214 B2 | 5/2005 | Alford et al. | |
| 7,497,443 B1 | 3/2009 | Steinetz et al. | |
| 8,075,255 B2 | 12/2011 | Morgan | |
| 9,188,228 B2 * | 11/2015 | Sarawate | F16J 15/128 |
| 9,267,385 B2 * | 2/2016 | Steiger | F01D 11/005 |

(Continued)

OTHER PUBLICATIONS

Aksit et al., "Parasitic corner leakage reduction in gas turbine nozzle-shroud inter-segment locations", Joint Propulsion Conferences, 37th Joint Propulsion Conference and Exhibit, American Institute of Aeronautics and Astronautics.

*Primary Examiner* — Gilbert Y Lee
(74) *Attorney, Agent, or Firm* — John P. Darling

(57) ABSTRACT

Various embodiments include gas turbine seals and methods of forming such seals. In some cases, a turbine includes: a first arcuate component adjacent to a second arcuate component, each arcuate component including one or more slots located in an end face, each of the one or more slots having a plurality of axial surfaces and radially facing surfaces extending from opposite ends of the axial surfaces and a seal assembly disposed in the slot. The seal assembly including an intersegment seal including a plurality of seal segments defining one or more corner regions. The intersegment seal disposed in a slot defining a high-pressure slot side and a low-pressure slot side, wherein the slot includes a plurality of slot segments. Each of the plurality of seal segments including at least one extended portion to either seal the one or more corner regions on a low-pressure slot side, form a recess in the intersegment seal, or both.

27 Claims, 13 Drawing Sheets

(56) References Cited

U.S. PATENT DOCUMENTS

2014/0348642 A1 11/2014 Weber et al.
2015/0098808 A1 4/2015 Morgan et al.
2016/0024951 A1 1/2016 Sarawate et al.

* cited by examiner

SEAL ASSEMBLY TO SEAL CORNER LEAKS IN GAS TURBINE

BACKGROUND

The subject matter disclosed herein relates to turbines. Specifically, the subject matter disclosed herein relates to seals in gas turbines.

The main gas-flow path in a gas turbine commonly includes the operational components of a compressor inlet, a compressor, a turbine and a gas outflow. There are also secondary flows that are used to cool the various heated components of the turbine. Mixing of these flows and gas leakage in general, from or into the gas-flow path, is detrimental to turbine performance.

The operational components of a gas turbine are contained in a casing. The turbine is commonly surrounded annularly by adjacent arcuate components. As used herein, the term "arcuate" may refer to a member, component, part, etc. having a curved or partially curved shape. The adjacent arcuate components include outer shrouds, inner shrouds, nozzle blocks, and diaphragms. The arcuate components may provide a container for the gas-flow path in addition to the casing alone. The arcuate components may secure other components of the turbine and may define spaces within the turbine. Between each adjacent pair of arcuate components is a space or gap that permits the arcuate components to expand as the operation of the gas turbine forces the arcuate components to expand.

Typically, one or more slots are defined on the end faces of each arcuate component for receiving a seal in cooperation with an adjacent slot of an adjacent arcuate component. The seal is placed in the slot to prevent leakage between the areas of the turbine on either side of the seal. These areas may include the main gas-flow path and secondary cooling flows.

In some embodiments, multiple slots within the end of a particular arcuate component may connect one to another. Furthermore, multiple slots within the end of a particular arcuate component may be angled in orientation to each other. Typically a planar seal is received in each of the slots that are connected. Each of the planar seals has ends, with the seals being positioned in each of the two slots in an end-to-end orientation. Each adjacent pair of the seal segments forms a seal intersection gap between the two seals. This seal intersection gap permits leakage between the internal and external areas of the gas turbine component. Reducing this gap improves gas turbine performance.

BRIEF DESCRIPTION

Various embodiments of the disclosure include gas turbine seal assemblies and methods of forming such seals. In accordance with one exemplary embodiment, disclosed is a seal assembly to seal a gas turbine hot gas path flow in a gas turbine. The seal assembly including an intersegment seal including a plurality of seal segments, the plurality of seal segments defining one or more corner regions, the intersegment seal disposed in a slot defining a high-pressure slot side and a low-pressure slot side, wherein the slot includes a plurality of slot segments. One or more of the plurality of seal segments including at least one extended portion to at least one of seal the one or more corner regions on a low-pressure slot side and form a recess in one or more of the plurality of seal segments.

In accordance with another exemplary embodiment, disclosed is a gas turbine. The gas turbine including a first arcuate component adjacent to a second arcuate component and a seal assembly. Each arcuate component including one or more slots located in an end face. Each of the one or more slots having a plurality of substantially axial surfaces and one or more radially facing surfaces extending from opposite ends of the substantially axial surfaces. The seal assembly disposed in the slot of the first arcuate component and the slot of the second arcuate component. The seal assembly comprising an intersegment seal including a plurality of seal segments. The plurality of seal segments defining one or more corner regions spanning between the axial surface and each of the radially facing surfaces of the one or more slots. The intersegment seal disposed in a slot defining a high-pressure slot side and a low-pressure slot side, wherein the slot includes a plurality of slot segments. One or more of the plurality of seal segments including at least one extended portion to at least one of seal the one or more corner regions on a low-pressure slot side and/or form a recess in one or more of the plurality of seal segments.

In accordance with yet another exemplary embodiment, disclosed is a method of assembling a seal in a turbine. The method including forming a seal assembly. The forming including providing an intersegment seal and applying the intersegment seal in a turbine. The intersegment seal including a plurality of seal segments and including at least one extended portion to at least one of seal one or more corner regions on a low-pressure slot side and/or form a recess in one or more of the plurality of seal segments. The turbine including a first arcuate component adjacent to a second arcuate component. Each arcuate component including one or more slots located in an end face. Each of the one or more slots having a plurality of axial surfaces and radially facing surfaces extending from opposite ends of the axial surfaces. The step of applying further including inserting the seal assembly in a slot of the one or more slots such that the intersegment seal is disposed in the slot on each arcuate component and in contact with the axial surfaces of the slots and extending over the radially facing surfaces of the slots.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
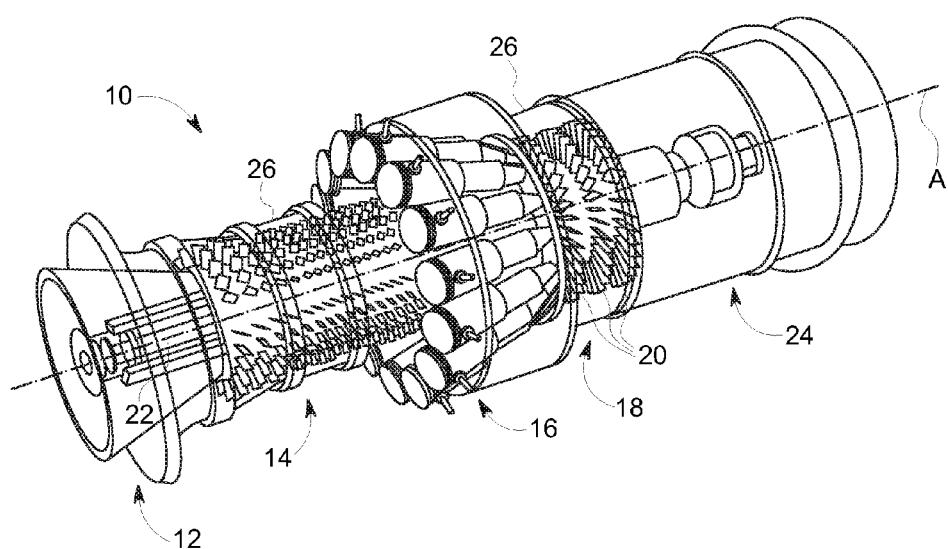
FIG. 1 shows a perspective partial cut-away view of a known gas turbine.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

As noted herein, the subject matter disclosed relates to turbines. Specifically, the subject matter disclosed herein relates to cooling fluid flow in gas turbines and the sealing within such turbines. In contrast to conventional approaches, various embodiments of the disclosure include gas turbomachine (or, turbine) static hot gas path components, such as nozzles and shrouds.

As denoted in these Figures, the "A" axis (FIG. 1) represents axial orientation (along the axis of the turbine rotor). As used herein, the terms "axial" and/or "axially" refer to the relative position/direction of objects along the axis A, which is substantially parallel with the axis of rotation of the turbomachine (in particular, the rotor section). As further used herein, the terms "radial" and/or "radially" refer to the relative position/direction of objects along an axis (not shown), which is substantially perpendicular with axis A and intersects axis A at only one location. Additionally, the terms "circumferential" and/or "circumferentially" refer to the relative position/direction of objects along a circumference (not shown) which surrounds axis A but does not intersect the axis A at any location. It is further understood that common numbering between the various Figures denotes substantially identical components in the Figures.

Referring to FIG. 1, a perspective view of one embodiment of a gas turbine 10 is shown. In this embodiment, the gas turbine 10 includes a compressor inlet 12, a compressor 14, a plurality of combustors 16, a compressor discharge (not shown), a turbine 18 including a plurality of turbine blades 20, a rotor 22 and a gas outflow 24. The compressor inlet 12 supplies air to the compressor 14. The compressor 14 supplies compressed air to the plurality of combustors 16 where it mixes with fuel. Combustion gases from the plurality of combustors 16 propel the turbine blades 20. The propelled turbine blades 20 rotate the rotor 22. A casing 26 forms an outer enclosure that encloses the compressor inlet 14, the compressor 14, the plurality of combustors 16, the compressor discharge (not shown), the turbine 18, the turbine blades 20, the rotor 22 and the gas outflow 24. The gas turbine 10 is only illustrative; teachings of the disclosure may be applied to a variety of gas turbines.

Figure 2:
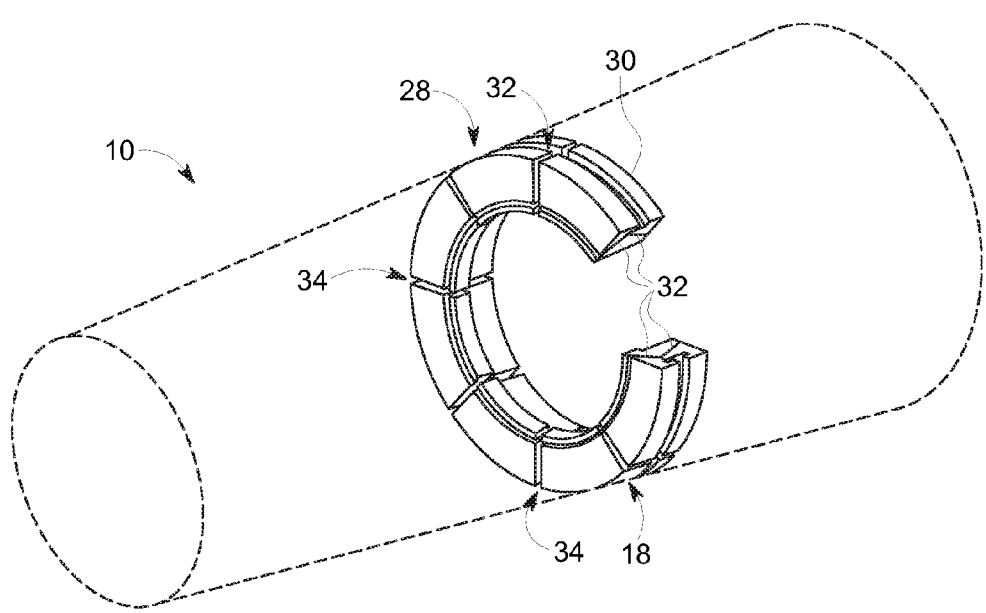
FIG. 2 shows a perspective view of known arcuate components in an annular arrangement.

In an embodiment, stationary components of each stage of a hot gas path (HGP) of the gas turbine 10 consists of a set of nozzles (stator airfoils) and a set of shrouds (the static outer boundary of the HGP at the rotor airfoils 20). Each set of nozzles and shrouds are comprised of numerous arcuate components arranged around the circumference of the hot gas path. Referring more specifically to FIG. 2, a perspective view of one embodiment of an annular arrangement 28 including a plurality of arcuate components 30 of the turbine 18 of the gas turbine 10 is shown. In the illustrated embodiment, the annular arrangement 28 as illustrated includes seven arcuate components 30 with one arcuate component removed for illustrative purposes. Between each of the arcuate components 30 is an inter-segment gap 34. This segmented construction is necessary to manage thermal distortion and structural loads and to facilitate manufacturing and assembly of the hardware.

A person skilled in the art will readily recognize that annular arrangement 28 may have any number of arcuate components 30; that the plurality of arcuate components 30 may be of varying shapes and sizes; and that the plurality of arcuate components 30 may serve different functions in gas turbine 10. For example, arcuate components in a turbine may include, but not be limited to, outer shrouds, inner shrouds, nozzle blocks, and diaphragms as discussed below.

Figure 3:
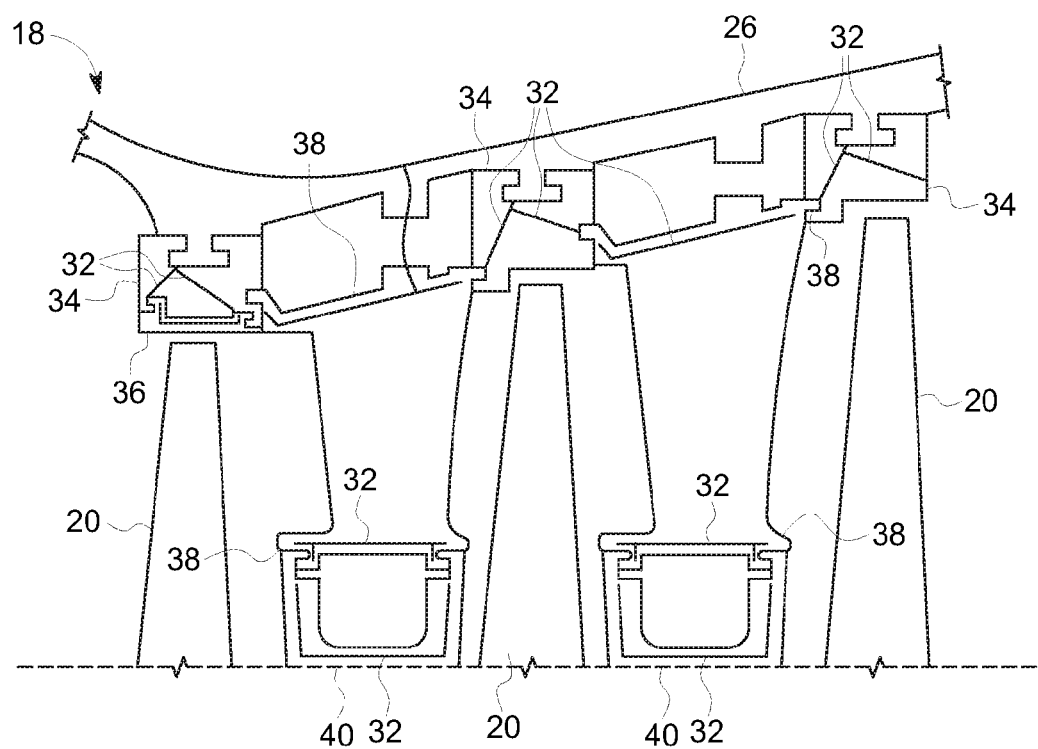
FIG. 3 shows a cross-sectional longitudinal view of a portion of a known turbine of a gas turbine.

Referring to FIG. 3, a cross-sectional view of one embodiment of turbine 18 of gas turbine 10 (FIG. 1) is shown. In this embodiment, the casing 26 encloses a plurality of outer shrouds 34, an inner shroud 36, a plurality of nozzle blocks 38, a plurality of diaphragms 40, and turbine blades 20. Each of the outer shrouds 34, inner shroud 36, nozzle blocks 38 and diaphragms 40 form a part of the arcuate components 30. Each of the outer shrouds 34, inner shrouds 36, nozzle blocks 38 and diaphragms 40 have one or more slots 32 in a side thereof. In this embodiment, the plurality of outer shrouds 34 connect to the casing 26; the inner shroud 36 connects to the plurality of outer shrouds 34; the plurality of nozzle blocks 38 connect to the plurality of outer shrouds 34; and the plurality of diaphragms 40 connect to the plurality of nozzle blocks 38. A person skilled in the art will readily recognize that many different arrangements and geometries of arcuate components are possible. Alternative embodiments may include different arcuate component geometries, more arcuate components, or less arcuate components.

Cooling air is typically used to actively cool and/or purge the static hot gas path (bled from the compressor of the gas turbine engine 10) leaks through the inter-segment gaps 34 for each set of nozzles and shrouds. This leakage has a negative effect on overall engine performance and efficiency because it is parasitic to the thermodynamic cycle and it has little if any benefit to the cooling design of the hot HGP component. As previously indicated, seals are typically incorporated into the inter-segment gaps 34 of static HGP components to reduce leakage. The one or more slots 32 provide for placement of such seals at the end of each arcuate component 30.

These inter-segment seals are typically straight, rectangular solid pieces of various types of construction (e.g. solid, laminate, shaped, such as "dog-bone"). The seals serve to seal the long straight lengths of the seal slots 32 fairly well, but they do not seal at the corners where adjacent seal slots intersect. The seals typically need to be shorter than the seal slots 32 to accommodate manufacturing variation and assembly constraints, resulting in the corner leaks being even larger. It is a significant benefit to engine performance and efficiency to seal these corner leaks more effectively. This is a challenging engine design detail because of numerous design constraints including the tight spaces in the inter-segment gaps 34 and seal slots 32, the need for relatively easy assembly and disassembly, thermal movement during engine operation, and the complicated route of leakage at the corner leaks. Previous attempts to minimize corner leakage have included the use of bent shim seals on the high-pressure side of the primary spline seals. However, effectiveness of this method of sealing the corner leakage was noted in that the shim seal was not located at the critical location (the low-pressure side of the seal slot 32).

Figure 4:
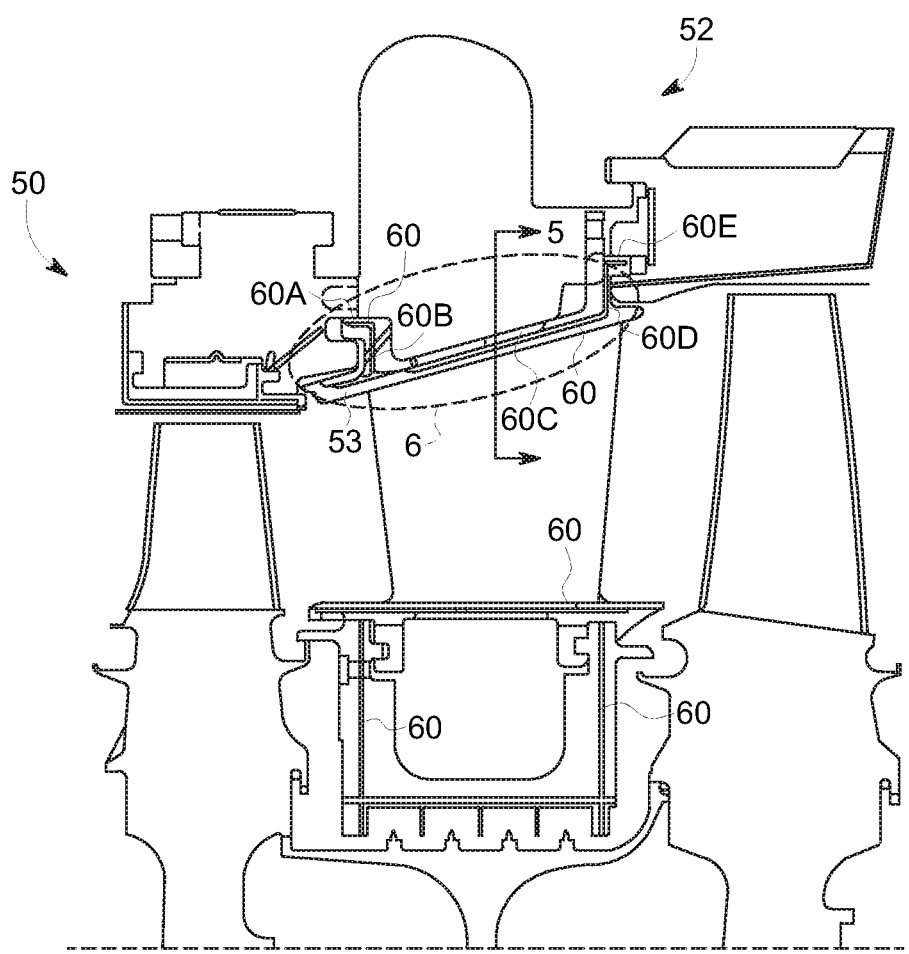
FIG. 4 shows a schematic cross-sectional view of a portion of a turbine, in accordance with one or more embodiments shown or described herein.
Figure 5:
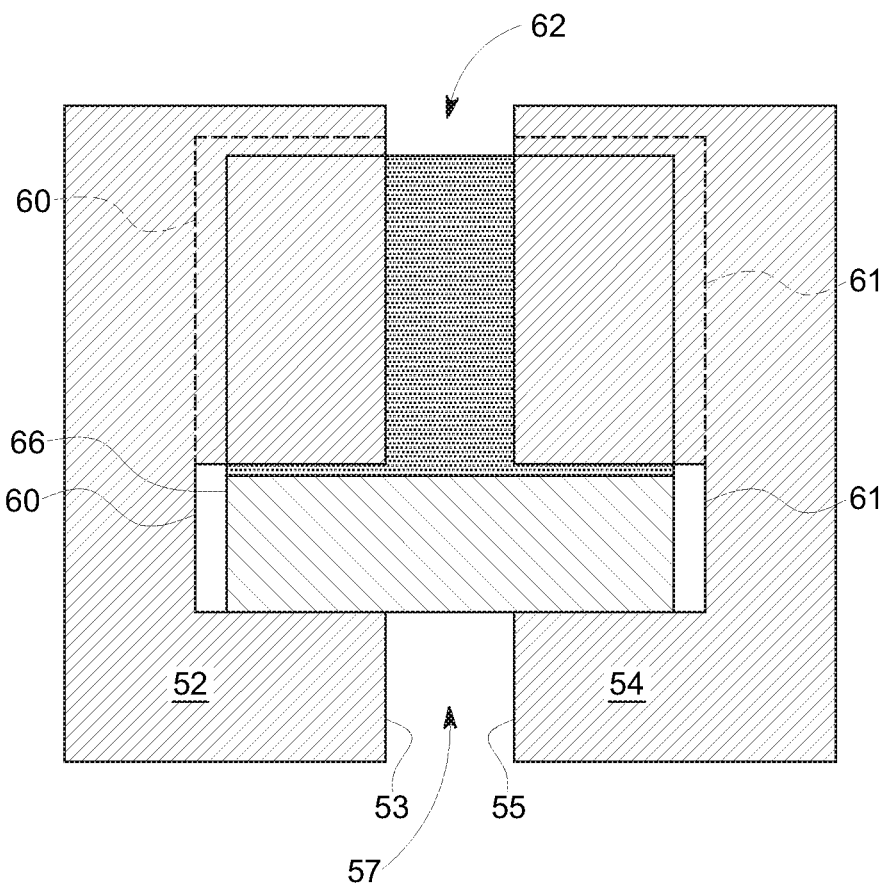
FIG. 5 shows a cross-sectional view of a seal assembly of FIG. 4 in relation to a first arcuate component and a second arcuate component, in accordance with one or more embodiments shown or described herein.
Figure 6:
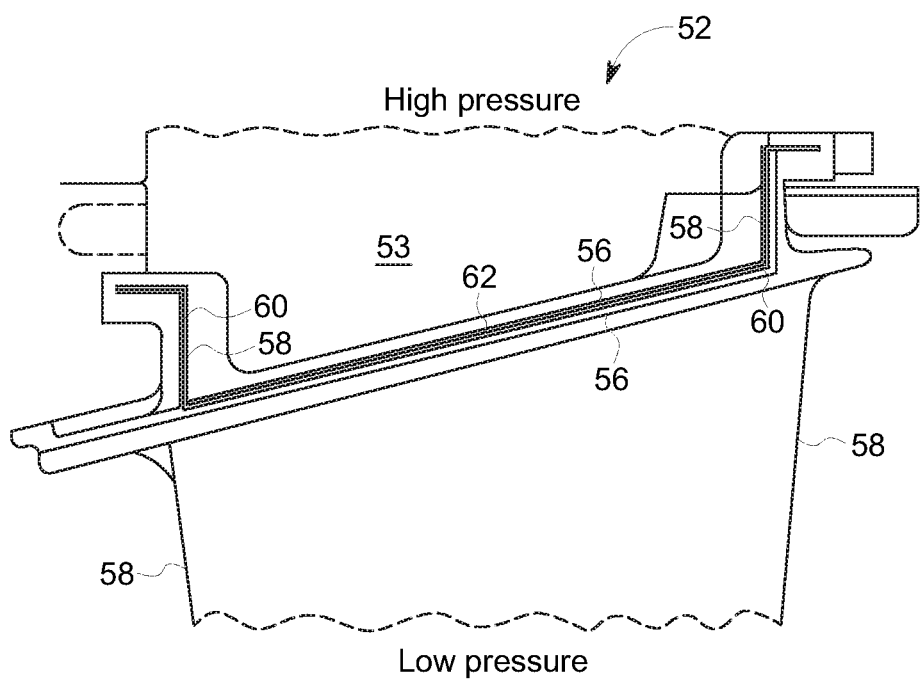
FIG. 6 shows a schematic cross-sectional view of a portion of the turbine of FIG. 4 as indicated by dashed line in FIG. 4, in accordance with one or more embodiments shown or described herein.
Figure 7:
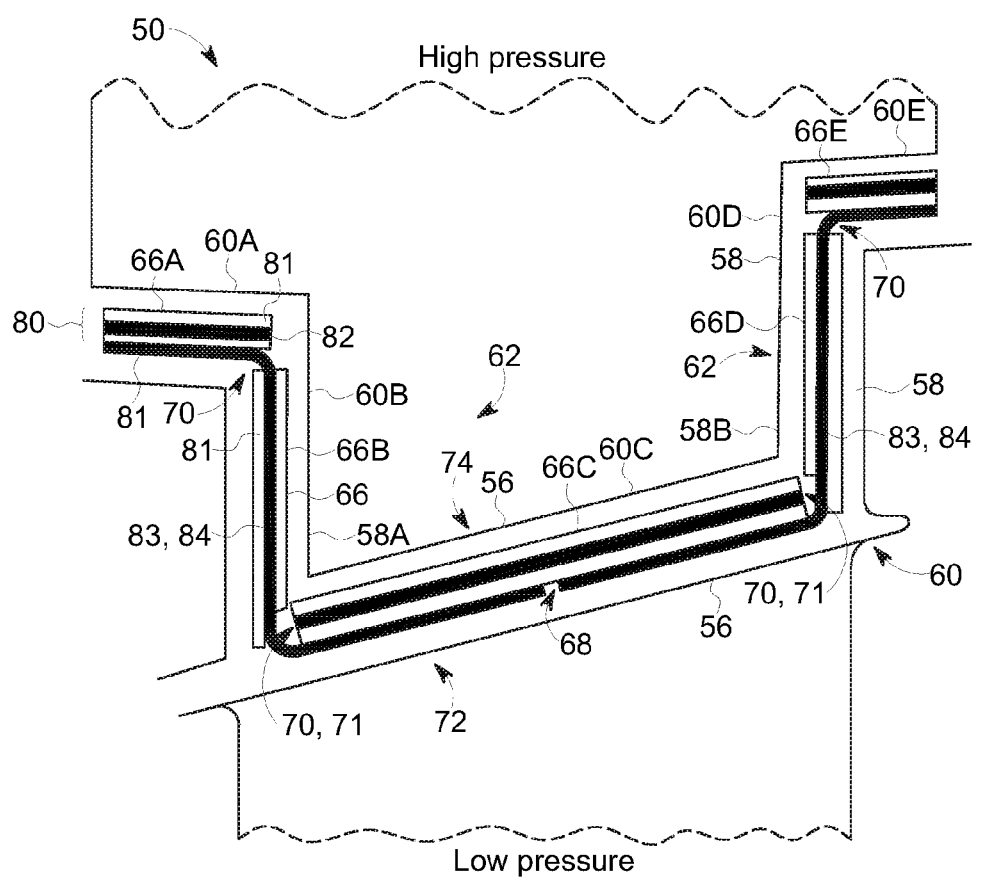
FIG. 7 shows a schematic cross-sectional view of the seal assembly of FIGS. 4-6, in accordance with one or more embodiments shown or described herein.

Turning to FIGS. 4-7, a cross-sectional longitudinal view of a gas turbine 50, generally similar to gas turbine 10 of FIGS. 1-3, is shown in FIG. 4, according to an embodiment. FIG. 4 shows an end view of an exemplary, and more particularly, a first arcuate component 52. FIG. 5 shows a cross-sectional view of the first arcuate component 52 and a second arcuate component 54, in spaced relation to one another. FIG. 6 shows an enlargement of a portion of the gas turbine engine 50, indicated by dashed line 6 in FIG. 4. FIG. 7 shows a further enlargement of a seal assembly as disclosed herein.

Referring more particularly to FIG. 4, the first arcuate component 52 includes a slot 60 formed in an end face 53 of the first arcuate component 52. The slot 60 may be comprised of multiple slot portions 60A, 60B, 60C, 60D, 60E, shown formed at an angle in relation to each other and connected to one another. The slot 60 may be comprised of any number of intersecting or connected slot portions.

FIG. 5 shows a cross-sectional axial view along line 5-5 of FIG. 4 of the first arcuate component 52 positioned adjacent to the second arcuate component 54. An intersegmental gap 57 is left between the first arcuate component 52 and the second arcuate component 54. An adjacent slot 61 on the second arcuate component 54 is shown. Similar to slot 60, the slot 61 may be formed of multiple slot portions formed at an angle in relation to each other and connected or intersecting to one another. Each slot 60, 61 includes a plurality of substantially axial surfaces 56 and a plurality of radially facing surfaces 58 extending from the end of the substantially axial surfaces 56, as best illustrated in FIGS. 4, 6 and 7, as shown in relation to slot 60. Alternate configurations and geometries of the slots 60, 61, including alternate seal slot geometry intersections, are anticipated by this disclosure.

In the illustrated embodiment of FIGS. 4-7, the gas turbine 50 includes a seal assembly 62 disposed in the one or more slots 60 or 61 (FIG. 5) where the seal assembly 62 contacts adjacent cooperating slots 60, 61 at their axial surfaces 56, and extends over the radially facing surfaces 58. It should be understood that the description of the seal assembly 62 will be described below in relation to slot 60 of the arcuate component 52, but is similarly applicable to slot 61 of arcuate component 54 upon disposing therein.

As best illustrated in FIG. 7, the seal assembly 62 includes an intersegment seal 66 including a plurality of seal segments 66A, 66B, 66C, 66D, 66E. In the illustrated embodiment, the intersegment seal 66 is a laminate seal, referred to as an intersegment laminate seal 66. More particularly, in the illustrated embodiment, each seal segment 66A, 66B, 66C, 66D, 66E is comprised of a plurality of individual layers 80, and more particularly a plurality of outer layers 81 and one or more inner layers 82 sandwiched therebetween the plurality of outer layers 81. The plurality of seal segments 66A, 66B, 66C, 66D, 66E defining one or more corner regions 70, where leakage may occur. The intersegment laminate seal 66 is disposed in a slot 60 defining a high-pressure slot side 74 and a low-pressure slot side 72, wherein the slot 60 includes a plurality of slot segments 60A, 60B, 60C, 60D, 60E. More particularly, each seal segment 66A, 66B, 66C, 66D, 66E is disposed in a slot segment 60A, 60B, 60C, 60D, 60E. In an embodiment, the intersegment laminate seal 66 may be formed of the plurality of outer layers 81 and the one or more inner layers 82 that are only partially coupled to one another, thereby allowing for flexibility of the intersegment laminate seal 66 (e.g., torsional movement).

As previously stated, the intersegment laminate seal 66 includes the plurality of seal segments 66A, 66B, 66C, 66D and 66E where each segment is separated from its neighboring segment (e.g., 66A and 66B), with each disposed in one of the multiples slot segments 60A, 60B, 60C, 60D, 60E. It is anticipated that the intersegment laminate seal 66 may be comprised of any number of segments, and that the five segment seal and cooperating slots of FIG. 7 are merely for illustrative purposes. Each segment 66A, 66B, 66C, 66D and 66E of the intersegment laminate seal 66 may correspond with a distinct surface of the slot 60 (e.g., segment 66B corresponds with a first radially facing surface 58A of the slot segment 60B, segment 66C corresponds with axial surface 56 of the slot segment 60C and segment 66D corresponds with a second radially facing surface 58B of the slot segment 60D, etc.). The plurality intersegment seal segments 66A, 66B, 66C, 66D and 66E define a seal intersection gap 71 between neighboring segments (e.g., 66A and 66B, 66C and 66D, etc.) at one or more corner regions 70 where leakage may occur.

As shown in FIG. 7, the intersegment laminate seal 66, and more particularly one or more of the plurality of seal segments 66A, 66B, 66C, 66D and 66E, includes at least one extended portion 83, and more particularly, at least one extended layer 84 of the plurality of layers 80. The at least one extended layer 84 serves to seal the one or more corner regions 70 or defines a recess (described presently) in one or more of the remaining laminate seal layers 80. In the illustrated embodiment of FIG. 7, at least one of the one or more inner layers 82 is extended on the intersegment seal segments 66B and 66D. The extended layers 84 are extended in a manner to overlay the seal segments 66A, 66C and 66E on a low-pressure side 72 of the seal slots 60A, 60C and 60E. By extending at least one of the inner layers 82 of the seal segments 66B and 66D in such a manner, the corner regions 70 are sealed against leakage through the seal intersection gaps 71. The extended layer 84 may include one or more small gaps 68 between the corner regions 70 to allow the extended layer 84 to accommodate manufacturing and assembly tolerances while sufficiently seating in the plurality of corner regions 70 defined in the seal slot 60 to effectively seal corner leakages via the seal intersection gaps 71 in the corner regions 70. In an embodiment, an outer layer 81 of the plurality of laminate layers 80 may be additionally be extended to further provide sealing at one or more of the corner regions 70.

According to an embodiment the intersegment laminate seal 66 (including segments 66A, 66B, 66C, 66D and 66E)

are adapted to move independently of one another. In an embodiment, the extended portions 83 substantially seal the corner regions 70 and resultant corner leakage defined by the intersegment laminate seal 66, and more particularly defined between neighboring seal segments 66A and 66B, 66B and 66C, 66C and 66D and 66D and 66E). In some particular embodiments, each of the one or more inner layers 82 has a thickness of approximately 0.1 millimeters to approximately 0.6 millimeters, and more particularly a thickness of approximately 0.254 millimeters to 0.381 millimeters. In an embodiment, the extended layer 84 has a width and overall length substantially equivalent to the width and overall length of the intersegment laminate seal 66.

As best illustrated in FIG. 7, the extended layer 84 extends axially on the low-pressure side 72 of the slot 60, and more particularly, a low-pressure side of the intersegment laminate seal segment 66C (66A and 66E). The extended layer 84 blocks leakage in the corner regions 70 at its critical location (the low-pressure-side 72 of the seal slot 60). The high-pressure side intersegment laminate seal 66C serves to seal the gaps 68 in the extended layer 84 and act as a back-up seal in instance that the extended layer 84 is damaged during operation.

The arrangement as disclosed provides a compact, relatively simple seal design that can be at least partially pre-assembled to aid in engine assembly (e.g., numerous seal pieces of the seal assembly 62 may be held together with shrink-wrap, epoxy, wax, or a similar substance that burns away during engine operation). In alternate embodiments, the seal is assembled in the engine piece-by-piece (no binding materials) and may not include any pre-assembly.

In an embodiment, an important aspect of the design implementation of the seal assembly 62 is to minimize a bend radius of the extended layer 84 at the corner regions 70 and/or to match the extended layer 84 bend radius with the seal slot 60 corner blend radius, in order to allow a tighter fit of the extended layer 84 to the low-pressure-side 72 of the seal slot 60. The extended layer 84 typically seals any under-the-seal leakage better than the standard spline seal because it is more conforming; the standard spline seals are typically thicker and more robust against damage.

Figure 8:
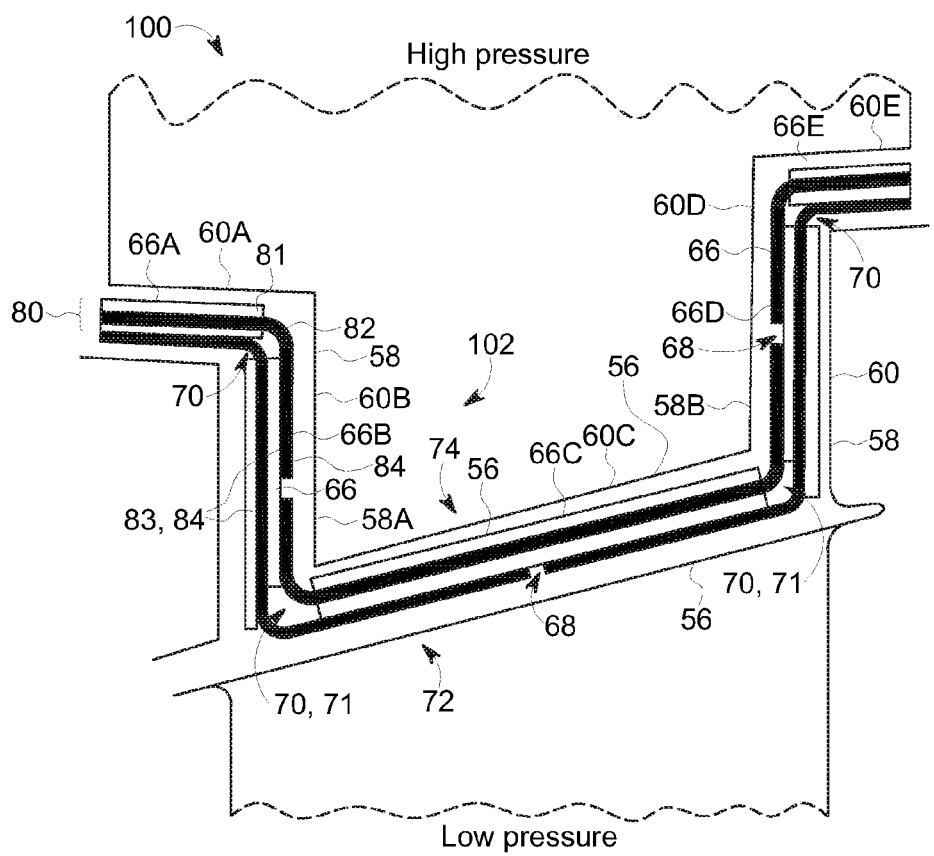
FIG. 8 shows a schematic cross-sectional view of an alternate embodiment of a seal assembly, in accordance with one or more embodiments shown or described herein.

FIG. 8 illustrates an alternate embodiment of a portion of a gas turbine 100 according to an additional embodiment. More particularly, FIG. 8 shows an enlargement of an alternative embodiment of the seal assembly as disclosed herein. It is understood that commonly labeled components between the various Figures can represent substantially identical components (e.g., one or more slots 60 comprised of multiple slot segments 60A, 60B, 60C, 60C, 60D, 60E, axial surfaces 56 and radially facing surfaces 58 extending from opposite ends of the axial surfaces 56, etc.). In an embodiment, the turbine 100 includes a seal assembly 102 disposed in slot 60, where the seal assembly 102 extends over axial surfaces 56, and extends over radially facing surfaces 58 of the slot 60.

Similar to the previous embodiment, the seal assembly 102 includes an intersegment laminate seal 66 disposed in the slot 60. The intersegment laminate seal 66 includes a plurality of segments 66A, 66B, 66C, 66D and 66E, where each segment is separated from its neighboring segment (e.g., 66A and 66B) at a corner region 70 by a seal intersection gap 71.

In the illustrated embodiment of FIG. 8, the intersegment laminate seal 66, and more particularly one or more of the plurality of seal segments 66A, 66B, 66C, 66D and 66E, includes at least one extended portion 83, and more particularly, includes at least one extended layer 84 of the plurality of layers 80. In contrast to the embodiment disclosed in FIGS. 4-7 in which seal segments 66B and 66D included an extended layer 84 extending axially along the seal segment 66C on a low-pressure side 74 of the slot 60, in this particular embodiment, seal segment 66A, 66C and 66E additionally include an extended layer 84 extending radially along the seal segments 66B and 66D on a high-pressure slot side 74. Accordingly, the extended layers 84 serve to seal the one or more corner regions 70 on a both the low-pressure slot side 72 and the high-pressure slot side 74. In the illustrated embodiment of FIG. 8, at least one of the one or more inner layers 82 of the intersegment seal segments 66B and 66D are extended to form a seal at the corner regions 70. More specifically, the extended layer 84 are extended from the seal segments 66B and 66D, in a manner to overlay the seal segments 66A, 66C and 66E on a low-pressure slot side 72 of the seal slots 60A, 60C and 60E. In addition, at least one of the one or more inner layers 82 of the intersegment seal segments 66A, 66C and 66E are extended in a manner to overlay the seal segments 66B and 66D on a high-pressure slot side 74 of the seal slots 60B and 60D. By extending at least one of the inner layers 82 of the seal segments 66A, 66B, 66C, 66D and 66E in such a manner, the corner regions 70 are sealed on both the low-pressure slot side 72 and the high-pressure slot side 74 against leakage through the seal intersection gaps 71.

The extended layers 84 may include one or more small gaps 68 between the corner regions 70 to allow the extended layers 84 to accommodate manufacturing and assembly tolerances while sufficiently seating in the plurality of corner regions 70 defined in the seal slot 60 to effectively seal corner leakages via the gaps 71 in the corner regions 70. In an embodiment, an outer layer 81 of the plurality of laminate layers 80 may be additionally be extended to further provide sealing at one or more of the corner regions 70.

Figure 9:
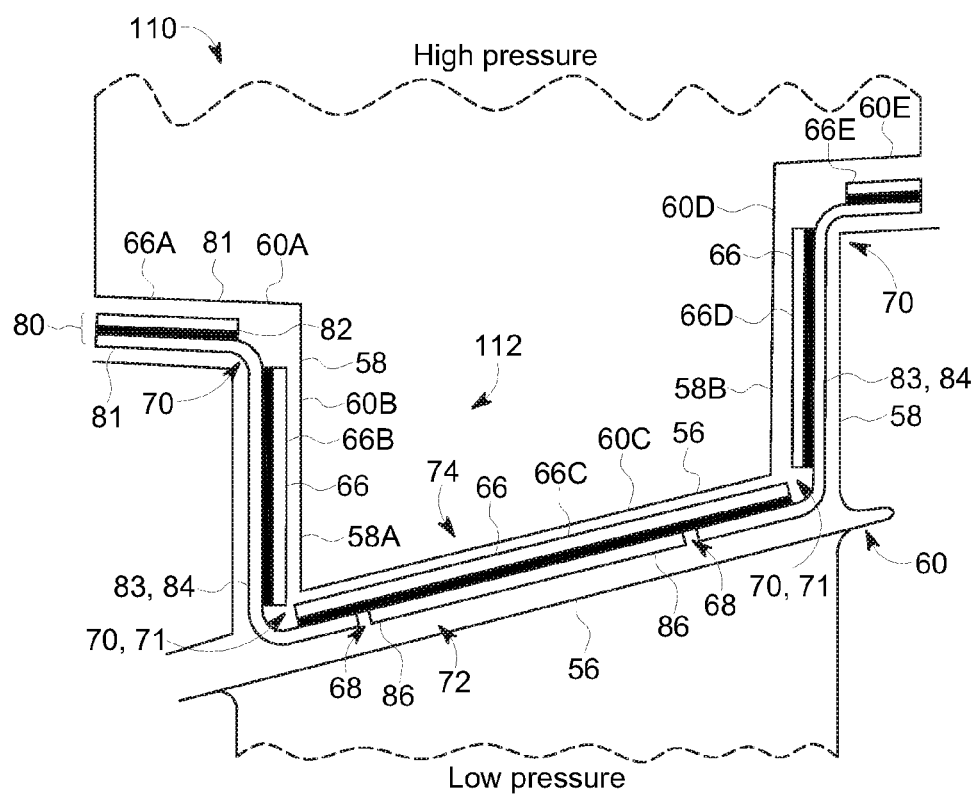
FIG. 9 shows a schematic cross-sectional view of an alternate embodiment of a seal assembly, in accordance with one or more embodiments shown or described herein.

FIG. 9 illustrates an alternate embodiment of a portion of a gas turbine 110 according to an additional embodiment. More particularly, FIG. 9 shows an enlargement of an alternative embodiment of the seal assembly as disclosed herein. It is understood that commonly labeled components between the various Figures can represent substantially identical components (e.g., one or more slots 60 comprised of multiple slot segments 60A, 60B, 60C, 60C, 60D, 60E, axial surfaces 56 and radially facing surfaces 58 extending from opposite ends of the axial surfaces 56, etc.). In an embodiment, the turbine 110 includes a seal assembly 112 disposed in slot 60, where the seal assembly 112 extends over the axial surfaces 56, and extends over radially facing surfaces 58 of the slot 60.

Similar to the previous embodiment, the seal assembly 112 includes an intersegment laminate seal 66 disposed in the slot 60. The intersegment laminate seal 66 includes a plurality of segments 66A, 66B, 66C, 66D and 66E, where each segment is separated from its neighboring segment (e.g., 66A and 66B) at a corner region 70 by a seal intersection gap 71.

In the illustrated embodiment of FIG. 9, the intersegment laminate seal 66, and more particularly one or more of the plurality of seal segments 66A, 66B, 66C, 66D and 66E, includes at least one extended portion 83, and more particularly, includes at least one extended layer 84 of the plurality of layers 80. In contrast to the embodiment disclosed in FIGS. 4-8 in which the extended layer 84 is an inner layer 82 of the one or more layers 80 that comprised the intersegment laminate seal 66, in this particular embodiment, the extended layer 84 is comprised of an outer layer 81 on the low-pressure slot side 72 of the seal segments 66B and 66D.

As illustrated, the extended layer 84 extends axially along the seal segments 66A, 66C and 66E on a low-pressure slot side 72. To accommodate the extension of the outer layer 81 of the adjacent seal segments, the outer layer 81 on a low-pressure slot side 72 of the seal segment 66C includes a recess 86. Otherwise stated, the high-pressure slot side 74 the outer layer 81 on the high-pressure side slot 74 and the inner layer 82 of the adjacent seal slot segment 66C are extended so as to overlay the extended layer 84 of the adjacent slot segments 66B and 66D and form a recess in one or more of the remaining laminate seal layers 80. The extended layers 84 extending about the corner regions 70 serve to seal the one or more corner regions 70 on the low-pressure slot side 72.

The extended layers 84 of the seal segments 66B and 66D when disposed in adjacent the recess 86 of the seal segment 66C may include one or more small gaps 68 between the corner regions 70 to allow the extended layers 84 to accommodate manufacturing and assembly tolerances while sufficiently seating in the plurality of corner regions 70 defined in the seal slot 60 to effectively seal corner leakages via the gaps 71 in the corner regions 70. As previously described, in an embodiment, the outer layer 81 on the high-pressure slot side 74 of the plurality of laminate layers 80 may further provide sealing at one or more of the corner regions 70.

Figure 10:
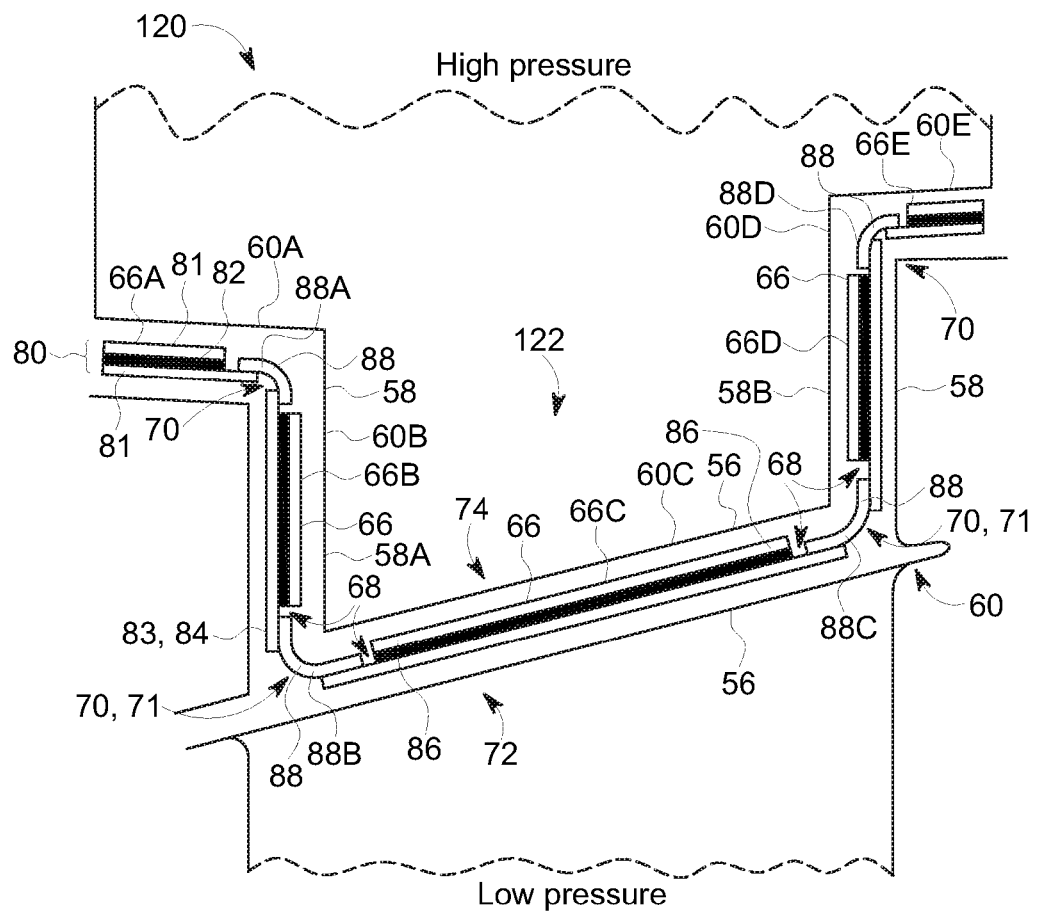
FIG. 10 shows a schematic cross-sectional view of an alternate embodiment of a seal assembly, in accordance with one or more embodiments shown or described herein.

FIG. 10 illustrates an alternate embodiment of a portion of a gas turbine 120 according to an additional embodiment. More particularly, FIG. 10 shows an enlargement of an alternative embodiment of the seal assembly as disclosed herein. It is understood that commonly labeled components between the various Figures can represent substantially identical components (e.g., one or more slots 60 comprised of multiple slot segments 60A, 60B, 60C, 60C, 60D, 60E, axial surfaces 56 and radially facing surfaces 58 extending from opposite ends of the axial surfaces 56, etc.). In an embodiment, the turbine 120 includes a seal assembly 122 disposed in slot 60, where the seal assembly 122 extends over the axial surfaces 56, and extends over radially facing surfaces 58 of the slot 60.

Similar to the previous embodiment, the seal assembly 122 includes an intersegment seal 66 disposed in the slot 60. In the illustrated embodiment, the intersegment seal 66 is a laminate seal, but alternatively, may be formed as a shaped solid seal. The intersegment laminate seal 66 includes a plurality of segments 66A, 66B, 66C, 66D and 66E, where each segment is separated from its neighboring segment (e.g., 66A and 66B) at a corner region 70 by a seal intersection gap 71.

In the illustrated embodiment of FIG. 10, the intersegment laminate seal 66, and more particularly one or more of the plurality of seal segments 66A, 66B, 66C, 66D and 66E, includes at least one extended portion 83, and more particularly, includes at least one extended layer 84 of the plurality of layers 80. In contrast to the embodiment disclosed in FIG. 9 in which the extension of the outer layer 81 forms the seal at the corner regions 70, in this particular embodiment, the extended layer 84, and more specifically the extended outer layer 81 of each of the seal segments 66A, 66B, 66C, 66D and 66E acts as a support for a shim seal 88. As illustrated, the extended layers 84 extend axially along the seal segments 66A, 66C and 66E on a low-pressure slot side 72 and radially along the seal segments 66B and 66D on a low-pressure slot side 72. The seal assembly 122 further includes the shim seal 88 disposed on the extended portions of the outer layers 81 and resides on a high-pressure slot side 74, relative to the extended layer 84. The shim seals 88 extend about the corner regions 70 and serve to seal the one or more corner regions 70.

To accommodate the shim seals 88, a high-pressure slot side 74 outer layer 81 and inner layer 82 of the seal segments define one or more recesses 86 relative to the extended layers 84. In an embodiment, the shim seal 88 is comprised of a plurality of segments 88A, 88B, 88C, and 88D that when disposed in adjacent recess 86 of the seal segments 66A, 66B, 66C, 66D and 66E may include one or more small gaps 68 between the recesses 86 and the shim seal segments 88A, 88B, 88C, and 88D to allow the extended layers 84 and shim seal segments 88A, 88B, 88C, and 88D to accommodate manufacturing and assembly tolerances while sufficiently seating in the plurality of corner regions 70 defined in the seal slot 60 to effectively seal corner leakages via the gaps 71 in the corner regions 70.

Figure 11:
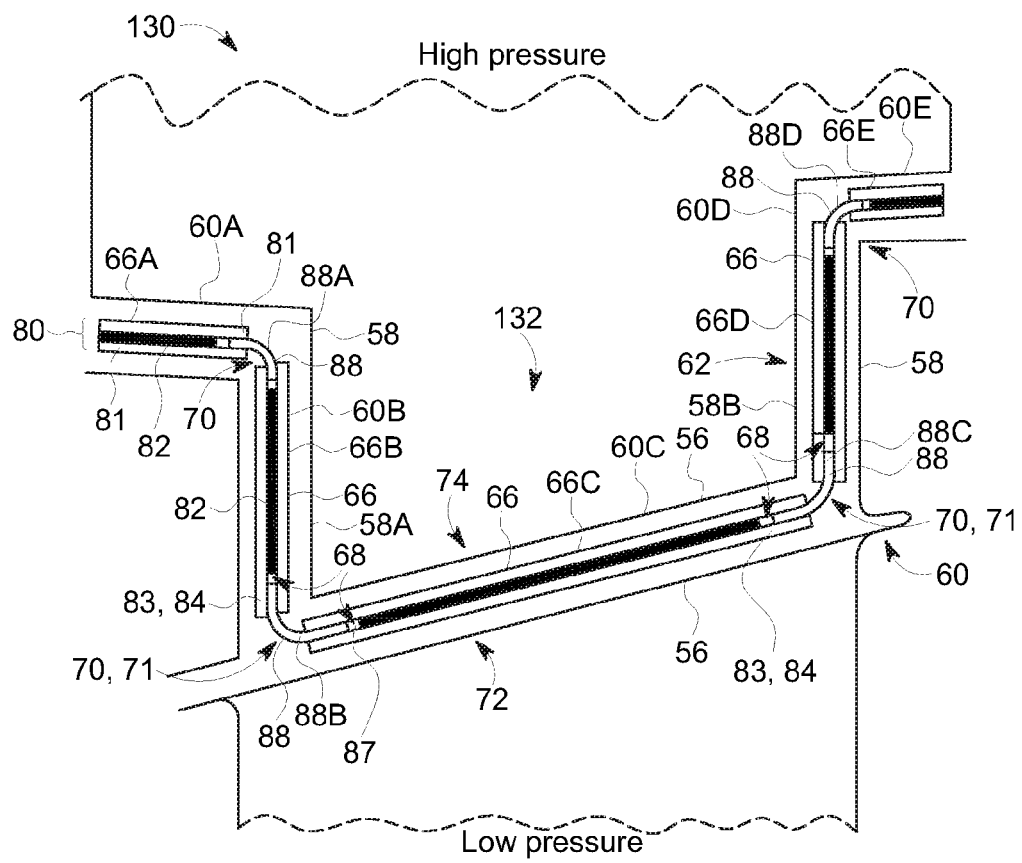
FIG. 11 shows a schematic cross-sectional view of an alternate embodiment of a seal assembly, in accordance with one or more embodiments shown or described herein.

FIG. 11 illustrates an alternate embodiment of a portion of a gas turbine 130 according to an additional embodiment. More particularly, FIG. 11 shows an enlargement of an alternative embodiment of the seal assembly as disclosed herein. It is understood that commonly labeled components between the various Figures can represent substantially identical components (e.g., one or more slots 60 comprised of multiple slot segments 60A, 60B, 60C, 60C, 60D, 60E, axial surfaces 56 and radially facing surfaces 58 extending from opposite ends of the axial surfaces 56, etc.). In an embodiment, the turbine 130 includes a seal assembly 132 disposed in slot 60, where the seal assembly 132 extends over the axial surfaces 56, and extends over radially facing surfaces 58 of the slot 60.

Similar to the previous embodiment, the seal assembly 132 includes an intersegment seal 66 disposed in the slot 60. In the illustrated embodiment, the intersegment seal 66 is a laminate seal, but alternatively, may be formed as a shaped solid seal. The intersegment laminate seal 66 includes a plurality of segments 66A, 66B, 66C, 66D and 66E, where each segment is separated from its neighboring segment (e.g., 66A and 66B) at a corner region 70 by a seal intersection gap 71.

In the illustrated embodiment of FIG. 11, the intersegment laminate seal 66, and more particularly one or more of the plurality of seal segments 66A, 66B, 66C, 66D and 66E, includes at least one extended portion 83, and more particularly, includes at least one extended layer 84 of the plurality of layers 80. In contrast to the embodiment disclosed in FIG. 10 in which a single extended layer 84, and more specifically the extended outer layer 81 of each of the seal segments 66A, 66B, 66C, 66D and 66E provides a support for a shim seal 88 on a low-pressure slot side 72, in this particular embodiment the outer layers 81 on a high-pressure slot side 74 are additionally extended to provide additional support for a plurality of shim seal segments 88A, 88B, 88C, and 88D. As illustrated, the extended layers 84 on both the high-pressure slot side 74 and the low-pressure slot side 72 extend axially along the seal segments 66A, 66C and 66E and radially along the seal segments 66B and 66D. To accommodate the shim seals 88, the seal assembly 132 further includes one or more recesses 86 defined between the extended portions of the outer layers 81. The shim seal 88 are at least partially disposed within the one or more recesses 86 and extending about the corner regions 70 to seal the one or more corner regions 70.

Similar to the previously disclosed embodiment, the shim seal 88 is comprised of the plurality of segments 88A, 88B, 88C, and 88D that when disposed in adjacent recesses 86 of the seal segments 66A, 66B, 66C, 66D and 66E may include one or more small gaps 87 between the recesses 86 and the shim seal segments 88A, 88B, 88C, and 88D to allow the extended layers 84 and shim seal segments 88A, 88B, 88C, and 88D to accommodate manufacturing and assembly tolerances while sufficiently seating in the plurality of corner regions 70 defined in the seal slot 60 to effectively seal corner leakages via the gaps 71 in the corner regions 70.

Figure 12:
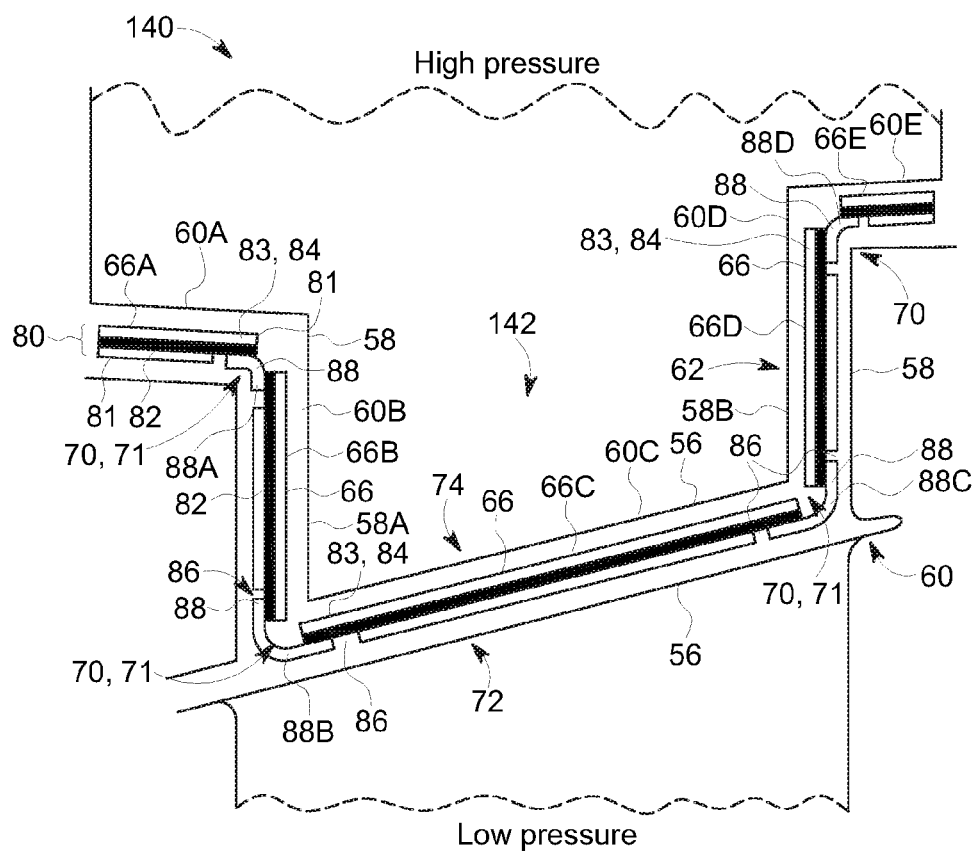
FIG. 12 shows a schematic cross-sectional view of an alternate embodiment of a seal assembly, in accordance with one or more embodiments shown or described herein.

FIG. 12 illustrates an alternate embodiment of a portion of a gas turbine 140 according to an additional embodiment. More particularly, FIG. 12 shows an enlargement of an alternative embodiment of the seal assembly as disclosed herein. It is understood that commonly labeled components between the various Figures can represent substantially identical components (e.g., one or more slots 60 comprised of multiple slot segments 60A, 60B, 60C, 60C, 60D, 60E, axial surfaces 56 and radially facing surfaces 58 extending from opposite ends of the axial surfaces 56, etc.). In an embodiment, the turbine 140 includes a seal assembly 142 disposed in slot 60, where the seal assembly 142 extends over the axial surfaces 56, and extends over radially facing surfaces 58 of the slot 60.

Similar to the previous embodiments, the seal assembly 142 includes an intersegment seal 66 disposed in the slot 60. In the illustrated embodiment, the intersegment seal 66 is a laminate seal, but alternatively, may be formed as a shaped solid seal. The intersegment laminate seal 66 includes a plurality of segments 66A, 66B, 66C, 66D and 66E, where each segment is separated from its neighboring segment (e.g., 66A and 66B) at a corner region 70 by a seal intersection gap 71.

In the illustrated embodiment of FIG. 12, the intersegment laminate seal 66, and more particularly one or more of the plurality of seal segments 66A, 66B, 66C, 66D and 66E, includes at least one extended portion 83, and more particularly, includes at least one extended layer 84 of the plurality of layers 80. In contrast to the embodiment disclosed in FIG. 9 in which the extension of the outer layer 81 on the low-pressure slot side 72 forms the seal at the corner regions 70, in this particular embodiment, the extended layer 84, and more specifically the extended outer layer 81 on the high-pressure slot side 74 and the inner layer 82 of one or more of the seal segments 66A, 66B, 66C, 66D and 66E provides a support for a shim seal 88. As illustrated, the extended layers 84 extend axially along the seal segments 66A, 66C and 66E on a high-pressure slot side 74 and radially along the seal segments 66B and 66D on a high-pressure slot side 74. The seal assembly 122 further includes the shim seal 88 disposed on the extended portions of the inner layer 82 and the extended outer layer 81 and resides on a low-pressure slot side 72, relative to the extended layers 84. The shim seals 88 extend about the corner regions 70 and serve to seal the one or more corner regions 70.

To accommodate the shim seals 88, the outer layer 81 on the high-pressure slot side 74 and the inner layer 82 of the seal segments define one or more recesses 86 relative to the extended layers 84. The shim seal 88 is comprised of a plurality of shim seal segments 88A, 88B, 88C, and 88D that when disposed in the adjacent recess 86 of the seal segments 66A, 66B, 66C, 66D and 66E may include one or more small gaps 68 between the recesses 86 and the shim seal segments 88A, 88B, 88C, and 88D to allow the extended layers 84 and shim seal segments 88A, 88B, 88C, and 88D to accommodate manufacturing and assembly tolerances while sufficiently seating in the plurality of corner regions 70 defined in the seal slot 60 to effectively seal corner leakages via the gaps 71 in the corner regions 70.

Figure 13:
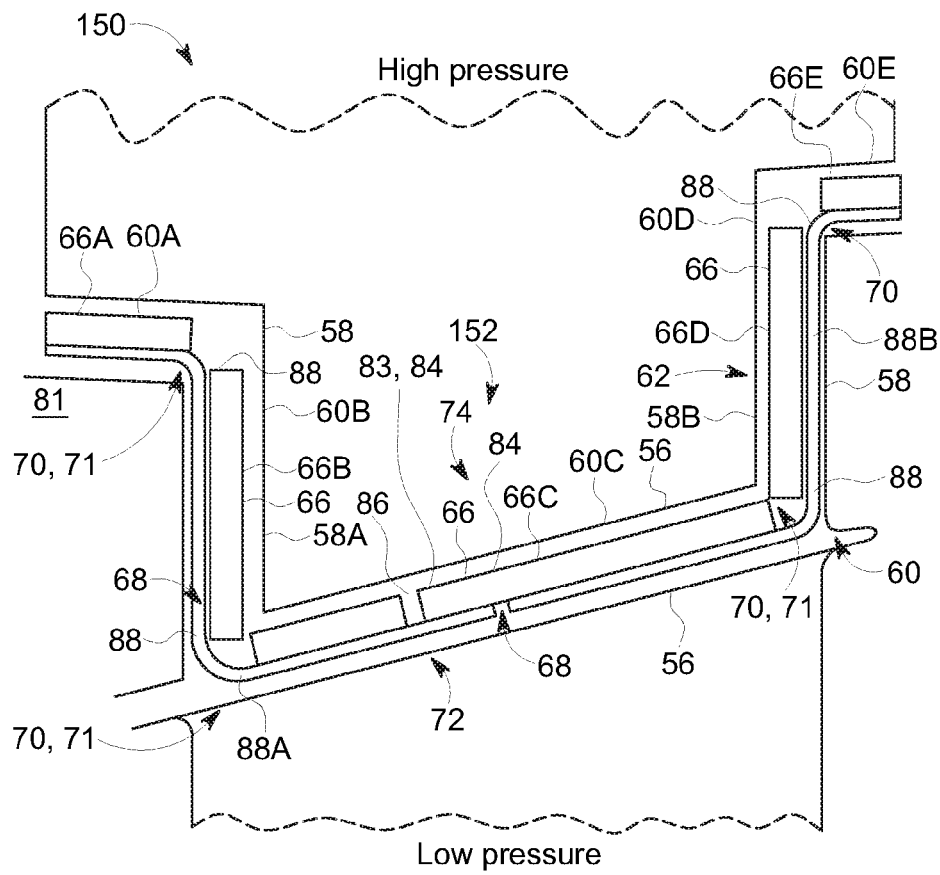
FIG. 13 shows a schematic cross-sectional view of an alternate embodiment of a seal assembly, in accordance with one or more embodiments shown or described herein.

FIG. 13 illustrates an alternate embodiment of a portion of a gas turbine 150 according to an additional embodiment. More particularly, FIG. 12 shows an enlargement of an alternative embodiment of the seal assembly as disclosed herein. It is understood that commonly labeled components between the various Figures can represent substantially identical components (e.g., one or more slots 60 comprised of multiple slot segments 60A, 60B, 60C, 60C, 60D, 60E, axial surfaces 56 and radially facing surfaces 58 extending from opposite ends of the axial surfaces 56, etc.). In an embodiment, the turbine 150 includes a seal assembly 152 disposed in slot 60, where the seal assembly 152 extends over the axial surfaces 56, and extends over radially facing surfaces 58 of the slot 60.

Similar to the previous embodiments, the seal assembly 152 includes an intersegment seal 66 disposed in the slot 60. In the illustrated embodiment, the intersegment seal 66 is illustrated as a solid seal, but alternatively, may be a laminated seal, such as previously described. The intersegment seal 66 includes a plurality of segments 66A, 66B, 66C, 66D and 66E, where each segment is separated from its neighboring segment (e.g., 66A and 66B) at a corner region 70 by a seal intersection gap 71.

In the illustrated embodiment of FIG. 13, the intersegment seal 66, and more particularly one or more of the plurality of seal segments 66A, 66B, 66C, 66D and 66E includes at least one extended portion 83, and more particularly, an extended portion 84 and a recess 86. In contrast to the embodiment disclosed in FIG. 12 in which the recess 86 is formed on the low-pressure slot side 72 to provide for seating of a shim seal 88 relative thereto the remaining portion of the intersegment seal 66, and form the seal at the corner regions 70, in this particular embodiment the recess 86 is formed on the high-pressure 74 slot side. A shim seal 88 is provided on the low-pressure slot side 72 so as to overlay the intersegment seal 66 and extending both radially and axially to form the seal at the corner regions 70. The shim seal 88 is comprised of a plurality of extended shim seal segments 88A and 88B that when disposed on the low-pressure side of the seal segments 66A, 66B, 66C, 66D and 66E may include one or more small gaps 68 to accommodate manufacturing and assembly tolerances while sufficiently seating in the plurality of corner regions 70 defined in the seal slot 60 to effectively seal corner leakages via the seal intersection gaps 71 in the corner regions 70.

As stated, the intersegment seal 66 includes the extended portion 84 and the at least one recess 86 so as to provide for the intersegment seal 66 to overlap the end portions of the shim seal 88 defined by the gap 68, and serve as a backup seal, yet allow for manufacturing tolerances and aid with assembly, etc. In the illustrated embodiment, the extended shim seal segments 88A and 88B are spot/tack welded to the intersegment seal segments that extend axially, and more particularly to the intersegment seal segments 66A, 66C and 66E. The extended shim seal segments 88A and 88B are not spot/tack welded to the intersegment seal segments that extend radially, and more particularly to intersegment seal segments 66B and 66D to allow for the shim seal segments 88A and 88B to move/slide vertically to seal/block the intersegment gaps 71 in the corner regions 70 when under the influence of gravitational forces.

Figure 14:
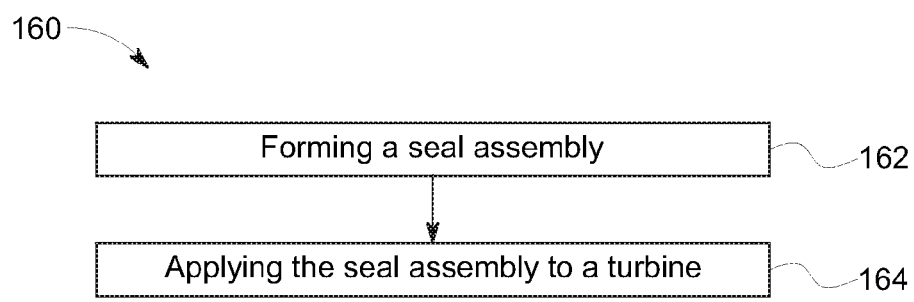
FIG. 14 shows a flow diagram illustrating a method, in accordance with one or more embodiments shown or described herein.

FIG. 14 is a flow diagram illustrating a method 160 of forming a seal in a gas turbine according to various Figures. The method can include the following processes:

Process P1, indicated at 162, includes forming a seal assembly (e.g., seal assembly 62, 102, 112, 122, 132, 142, 152), the forming including providing an intersegment laminate seal 66. The intersegment laminate seal 66 including a plurality of seal segments 66A, 66B, 66C, 66D and 66D, each comprised of one or more outer layers 81 and one or more inner layers 82. The plurality of seal segments 66A, 66B, 66C, 66D and 66E defining one or more corner regions 70. The intersegment laminate seal 66 disposed in a slot 60 defining a high-pressure slot side 74 and a low-pressure slot side 72, wherein the slot 60 includes a plurality of slot segments 60A, 60B, 60C, 60D and 60E. Each of the plurality of seal segments 66A, 66B, 66C, 66D and 66E including at least one extended layer 84 to seal the one or more corner regions 70 on a low-pressure slot side 72, form a recess 86 in one or more of the remaining laminate seal layers 80 or both.

Process P2, indicated at 164, includes applying the seal assembly (e.g., the seal assembly 62, 102, 112, 122, 132, 142, 152) to a turbine (e.g., gas turbine 50, FIG. 4), where applying includes inserting the seal assembly 62, 102, 112, 122, 132, 142, 152 in a slot 60 such that the intersegment laminate seal 66 effectively seals corner leakages via one or more gaps 71 in the corner regions 70. In an embodiment, the seal assembly 62, 102, 112, 122, 132, 142, 152 is disposed adjacent to the axial surfaces 56 and extends over the radially facing surfaces 58 of the slot 60.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly to seal a gas turbine hot gas path flow in a gas turbine, the seal assembly comprising:
   an intersegment seal including a plurality of seal segments, the plurality of seal segments defining one or more corner regions, the intersegment seal disposed in a slot defining a high-pressure slot side and a low-pressure slot side, wherein the slot includes a plurality of intersecting slot segments, the one or more corner regions spanning each of the intersecting slot segments, one or more of the plurality of seal segments including at least one extended portion to at least one of:
   seal the one or more corner regions on a low-pressure slot side; and
   form a recess in one or more of the plurality of seal segments.

2. The seal assembly of claim 1, wherein the intersegment seal is an intersegment laminate seal with each of the plurality of seal segments comprised of a plurality of outer layers and one or more inner layers.

3. The seal assembly of claim 2, wherein the at least one extended portion of at least one of the plurality of seal segments includes one or more first extended inner layer to seal the one or more corner regions on the low-pressure slot side.

4. The seal assembly of claim 3, wherein the at least one extended portion of at least one of the plurality of seal segments further includes one or more additional extended inner layers to seal the one or more corner regions on a high-pressure slot side.

5. The seal assembly of claim 2, wherein the at least one extended portion of at least one of the plurality of seal segments includes at least one extended outer layer to seal the one or more corner regions on a low-pressure slot side.

6. The seal assembly of claim 5, wherein at least one of the plurality of seal segments includes an outer layer defining at least one recess to accommodate the extended outer layer of another of the plurality of seal segments.

7. The seal assembly of claim 1, further comprising a shim seal disposed on a high-pressure slot side and supported by the extended portion to seal the one or more corner regions.

8. The seal assembly of claim 1, wherein at least one of the plurality of seal segments includes an extended outer portion, an extended inner portion, and a shim seal disposed at least partially within a recess defined between the extended inner portion and the extended outer portion to seal the one or more corner regions.

9. The seal assembly of claim 1, wherein at least one of the plurality of seal segments includes at least one extended outer portion to seal the one or more corner regions on a high-pressure slot side and further comprising a shim seal disposed on a low-pressure slot side to seal the one or more corner regions.

10. The seal assembly of claim 1, wherein at least one of the plurality of seal segments includes at least one recess on a high-pressure slot side and further comprising an extended shim seal disposed on a low-pressure slot side, the extended shim seal including a gap formed therein, that in combination with the recess, seals the one or more corner regions.

11. A gas turbine comprising:
   a first arcuate component adjacent to a second arcuate component, each arcuate component including one or more slots located in an end face, each of the one or more slots having a plurality of substantially axial surfaces and one or more radially facing surfaces extending from opposite ends of the substantially axial surfaces, defining a plurality of intersecting slot segments; and
   a seal assembly disposed in the slot of the first arcuate component and the slot of the second arcuate component, the seal assembly comprising:
      an intersegment seal including a plurality of seal segments, the plurality of seal segments defining one or more corner regions spanning between the axial surface and each of the radially facing surfaces of the one or more slots, the intersegment seal disposed in a slot defining a high-pressure slot side and a low-pressure slot side, wherein one or more of the plurality of seal segments including at least one extended portion to at least one of:
seal the one or more corner regions on a low-pressure slot side; and
form a recess in one or more of the plurality of seal segments.

12. The gas turbine of claim 11, wherein the intersegment seal is an intersegment laminate seal with each of the plurality of seal segments comprised of a plurality of outer layers and one or more inner layers.

13. The gas turbine of claim 12, wherein the at least one extended portion of at least one of the plurality of seal segments includes one or more first extended inner layer to seal the one or more corner regions on the low-pressure slot side.

14. The gas turbine of claim 12, wherein the at least one extended portion of at least one of the plurality of seal segments further includes one or more additional extended inner layers to seal the one or more corner regions on a high-pressure slot side.

15. The gas turbine of claim 12, wherein the at least one extended portion of at least one of the plurality of seal segments includes at least one extended outer layer to seal the one or more corner regions on a low-pressure slot side.

16. The gas turbine of claim 12, wherein at least one of the plurality of seal segments includes an outer layer defining at least one recess to accommodate the extended outer layer of another of the plurality of seal segments.

17. The gas turbine of claim 11, further comprising a shim seal disposed on one of a high-pressure slot side or a low-pressure slot side to seal the one or more corner regions.

18. The gas turbine of claim 11, wherein at least one of the plurality of seal segments includes an extended outer portion, an extended inner portion, and a shim seal disposed at least partially within a recess defined between the extended inner portion and the extended outer portion to seal the one or more corner regions.

19. The seal assembly of claim 11, wherein at least one of the plurality of seal segments includes at least one recess on a high-pressure slot side and further comprising an extended shim seal disposed on a low-pressure slot side, the extended shim seal including a gap formed therein, that in combination with the recess, seals the one or more corner regions.

20. A method of assembling a seal in a turbine, the method comprising:
forming a seal assembly, the forming including:
providing an intersegment seal including a plurality of seal segments, and including at least one extended portion to at least one of:
seal one or more corer regions on a low-pressure slot side; and
form a recess in one or more of the plurality of seal segments,
applying the intersegment seal in the turbine, the turbine having:
a first arcuate component adjacent to a second arcuate component, each arcuate component including one or more slots located in an end face, each of the one or more slots having a plurality of axial surfaces and radially facing surfaces extending from opposite ends of the axial surfaces, defining a plurality of intersecting slot segments;
the applying including inserting the seal assembly in a slot of the one or more slots such that the intersegment seal is disposed in the slot on each arcuate component and in contact with the axial surface of the slots and extending over the radially facing surfaces of the slots.

21. The method of claim 20, wherein the intersegment seal is an intersegment laminate seal with each of the plurality of seal segments comprised of an outer layer and one or more inner layers.

22. The method of claim 21, wherein the at least one extended portion of at least one of the plurality of seal segments includes one or more first extended inner layer to seal the one or more corner regions on the low-pressure slot side.

23. The method of claim 21, wherein the at least one extended portion of at least one of the plurality of seal segments further includes one or more additional extended inner layers to seal the one or more corner regions on a high-pressure slot side.

24. The method of claim 21, wherein the at least one extended portion of at least one of the plurality of seal segments includes at least one extended outer layer to seal the one or more corner regions on a low-pressure slot side.

25. The method of claim 20, further comprising a shim seal disposed an one of a high-pressure slot side or a low-pressure slot side to seal the one or more corner regions.

26. The method of claim 20, wherein at least one of the plurality of seal segments includes an extended outer portion, an extended inner portion, and a shim seal disposed at least partially within a recess defined between the extended inner portion and the extended outer portion to seal the one or more corer regions.

27. The method of claim 20, wherein at least one of the plurality of seal segments includes at least one recess on a high-pressure slot side and further comprising an extended shim seal disposed on a low-pressure slot side, the extended shim seal including a gap formed therein, that in combination with the recess, seals the one or more corner regions.

* * * * *